US008015233B2

(12) United States Patent
Li et al.

(10) Patent No.: US 8,015,233 B2
(45) Date of Patent: Sep. 6, 2011

(54) METHOD FOR HANDLING ASYNCHRONOUS DATABASE TRANSACTIONS IN A WEB BASED ENVIRONMENT

(75) Inventors: Leilei Li, San Jose, CA (US); Dorothy Ching-Hui Lin, Sunnyvale, CA (US); Jack Chiu-Chiu Yuan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 707 days.

(21) Appl. No.: 11/226,812

(22) Filed: Sep. 13, 2005

(65) Prior Publication Data

US 2007/0061457 A1    Mar. 15, 2007

(51) Int. Cl.
*G06F 15/16* (2006.01)
*G06F 15/173* (2006.01)
*G06F 7/00* (2006.01)
(52) U.S. Cl. ........ 709/201; 709/203; 709/225; 707/607; 707/799
(58) Field of Classification Search .................. 709/220, 709/201
See application file for complete search history.

(56) References Cited

U.S. PATENT DOCUMENTS

| | | | |
|---|---|---|---|
| 6,442,552 B1 * | 8/2002 | Frolund et al. | 707/10 |
| 6,748,420 B1 * | 6/2004 | Quatrano et al. | 709/205 |
| 7,120,697 B2 * | 10/2006 | Aiken et al. | 709/229 |
| 7,152,111 B2 * | 12/2006 | Allred et al. | 709/227 |
| 2001/0034791 A1 * | 10/2001 | Clubb et al. | 709/238 |
| 2001/0039586 A1 | 11/2001 | Primak et al. | |
| 2002/0052968 A1 * | 5/2002 | Bonefas et al. | 709/231 |
| 2002/0073211 A1 * | 6/2002 | Lin et al. | 709/229 |
| 2002/0095588 A1 * | 7/2002 | Shigematsu et al. | 713/186 |
| 2002/0116523 A1 * | 8/2002 | Warrier et al. | 709/238 |
| 2002/0120846 A1 | 8/2002 | Stewart et al. | |
| 2004/0044771 A1 * | 3/2004 | Allred et al. | 709/227 |
| 2004/0162880 A1 * | 8/2004 | Arnone et al. | 709/206 |
| 2005/0246292 A1 * | 11/2005 | Sarcanin | 705/67 |
| 2007/0061418 A1 * | 3/2007 | Berg | 709/217 |
| 2007/0088854 A1 * | 4/2007 | Park et al. | 709/250 |

* cited by examiner

*Primary Examiner* — Yasin Barqadle
*Assistant Examiner* — Joe Chacko
(74) *Attorney, Agent, or Firm* — Toler Law Group

(57) ABSTRACT

A method for handling asynchronous database transactions in a web based environment is disclosed. The method comprise providing a first ID from a device via a dedicated persistent connection and generating a second ID in an application server upon receipt of the first ID. The method also include utilizing the first ID and second ID to obtain the appropriate data from a database system and to send the appropriate data to the device. A method in accordance with the present invention uses a database resource adapter, which runs inside an application server, to generate a socket ID internally for every input transaction running with the dedicated persistent socket connection and also saves the customer-specified client ID for database queue creation and legacy application. This operation is transparent to the customers' client application.

14 Claims, 4 Drawing Sheets

200

METHOD FOR HANDLING ASYNCHRONOUS DATABASE TRANSACTIONS IN A WEB BASED ENVIRONMENT

FIELD OF THE INVENTION

The present invention relates generally to databases and more specifically to handling database transactions in web based environments.

BACKGROUND OF THE INVENTION

Sysplex (multiprocessor cluster-based) enabled infrastructures are utilized extensively for workflow of client applications. For example, they are utilized in automatic teller machine (ATM) transactions. It has been found that some banking customers have experienced significant operational issues when accessing data in such an infrastructure.

Any customer who has a sysplex-enabled infrastructure that uses a web application server, such as WebSphere, with a TCP/IP gateway (for example, IMS Connect) to access a database and sends their asynchronous transactions using dedicated persistent socket will receive a duplicate client ID problem. When the duplicate socket ID problem is generated, the transaction request that was sent will either hang, return an error message, or become lost. This is a severe problem because the customer's clients potentially will be left standing at an ATM machine waiting for a transaction that cannot be completed.

To describe these issues in more detail, refer now to the following description in conjunction with the accompanying figures. There are two scenarios in which the duplicate socket ID problem is generated.

FIG. 1 is a first embodiment of a conventional sysplex enabled infrastructure 10. The infrastructure 10 includes a sysplex distributer 12, two plurality application servers 14a-14n, a TCP/IP gateway 16 and a database system 17. The sysplex distributor 12 assigns a transaction request to a specific application server 14a-14n. Each application server 14a-14n includes a resource adapter 19a-19n. The first scenario is if the customer is in a multi-thread environment where the sysplex distributor (SD) 12 is managing multiple application servers 14a-14n. The purpose of the SD 12 is to manage and balance the workflow and increase server availability.

In this scenario, when an ATM machine 20 whose client ID is ATM1 sends an asynchronous transaction request, the sysplex distributor 12 assigns the transaction request to a specific server, for example, server 14a. The resource adapter 19a inside server 14a sends the transaction request to the database system 17 through a TCP/IP gateway system 16 using a dedicated persistent socket connection 21a. The dedicated persistent socket connection 21 must have a unique client ID, which in this case is ATM1. The client ID identifies the client application and allows only transaction requests from that client application to reuse the socket connection; hence it is a dedicated persistent socket. The transaction is completed when the response is returned to the ATM machine 20 and the interaction ends. However, because the socket 21a is a dedicated persistent socket, that connection from the server 14a to the TCP/IP gateway 16 stays open to be reused for the next transaction request from the ATM1 client application.

If another transaction request is sent by the same ATM machine 20 (whose client ID is ATM1) and the sysplex distributor 12 assigns the request to another web application server, for example application server 14b, the same process occurs. The resource adapter 19b inside application server 14b sends the transaction to database system 17 through the TCP/IP gateway 16 using the persistent socket connection 21b that contains the ATM1 client ID. However, the server 14a already has the ATM1 client ID socket connection open. The gateway 16 recognizes that the socket connection 21a is open on server 14a and rejects the transaction request from server 14n with the message that it is a duplicated client ID even though the interaction on server 14a had completed. Because each dedicated persistent socket connection 14 must have its own unique client ID and the ATM machine 20 only has one ID, a duplicate socket ID error is generated. If multiple transaction requests are sent through the ATM1 machine 20 and distributed to different servers by the SD 12, many transactions will be rejected due to the duplicate ID problem.

Another scenario that generates the duplicated client ID problem is if the customer uses one application server and creates multiple servant regions within that server. Similar to the SD, the server acts like a workflow manager and directs transaction requests to specific servant regions to increase server availability. The following figure illustrates the process flow in which the duplicated socket ID problem is generated.

FIG. 2 is a second embodiment of a conventional sysplex enabled infrastructure 10'. The infrastructure 10' includes a sysplex distributor 12', an application server 14', a TCP/IP gateway 16" and a database system 17'. SD 12 assigns a transaction request to servant regions 30a-30n within the server 14'.

In the second scenario, a transaction request is sent to a servant region 30a which is received by database system 17'. A response is returned to the ATM 20' and the interaction is completed. However, when the ATM 20' sends in a second request and that request is directed to the servant region 30b, a duplicated socket ID problem is generated because a socket connection 21a' with the client ID ATM1 is open in servant region 30a. As a result, the TCP/IP gateway 16' rejects a message and the transaction request fails.

This problem increases exponentially if any customer has a sysplex structure where there are multiple application servers and each of those servers have multiple servant regions.

To address this problem, a customer can choose to use shareable persistent socket for sending asynchronous transactions to the application server to bypass the duplicate client ID problem. However, with this method, the customers must rewrite their client applications and not specify a customer-specified client ID to an application server. This eliminates the capability of using the customer-specified client ID for tracking, security, and maintenance purposes.

Also, because the legacy application running in the database in most cases uses the customer-specified client ID to identify the client application for unsolicited messages, the legacy application must then be re-written for this solution. Furthermore, with this solution, using the sharable persistent socket increases the number of IMS output queues, thus impacting IMS storage requirements.

Accordingly, what is needed is a system and method that overcomes the above-described operational issues. The system and method should be cost effective, easily implemented and adaptable to web-enabled database systems. The present invention addresses such a need.

SUMMARY OF THE INVENTION

A method and system for handling asynchronous database transactions in a web based environment is disclosed. The method and system comprise providing a first ID from a device via a dedicated persistent connection and generating a second ID in an application server upon receipt of the first ID. The method and system also include utilizing the first ID and second ID to obtain the appropriate data from a database system and to send the appropriate data to the device.

A system and method in accordance with the present invention uses a database resource adapter, which runs inside an application server, to generate a socket ID internally for every input transaction running with the dedicated persistent socket connection and also saves the customer-specified client ID for database queue creation and legacy application. This operation is transparent to the customers' client application.

DETAILED DESCRIPTION

The present invention relates generally to databases and more specifically to handling database transactions in web based environments. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

A system and method in accordance with the present invention uses a database resource adapter, which runs inside an application server, to generate a socket ID internally for every input transaction running with the dedicated persistent socket connection and also saves the customer-specified client ID for database queue creation and legacy application. This operation is transparent to the customers' client application. The system and method in accordance with the present invention has many advantages which are described hereinbelow.

Figure 1:
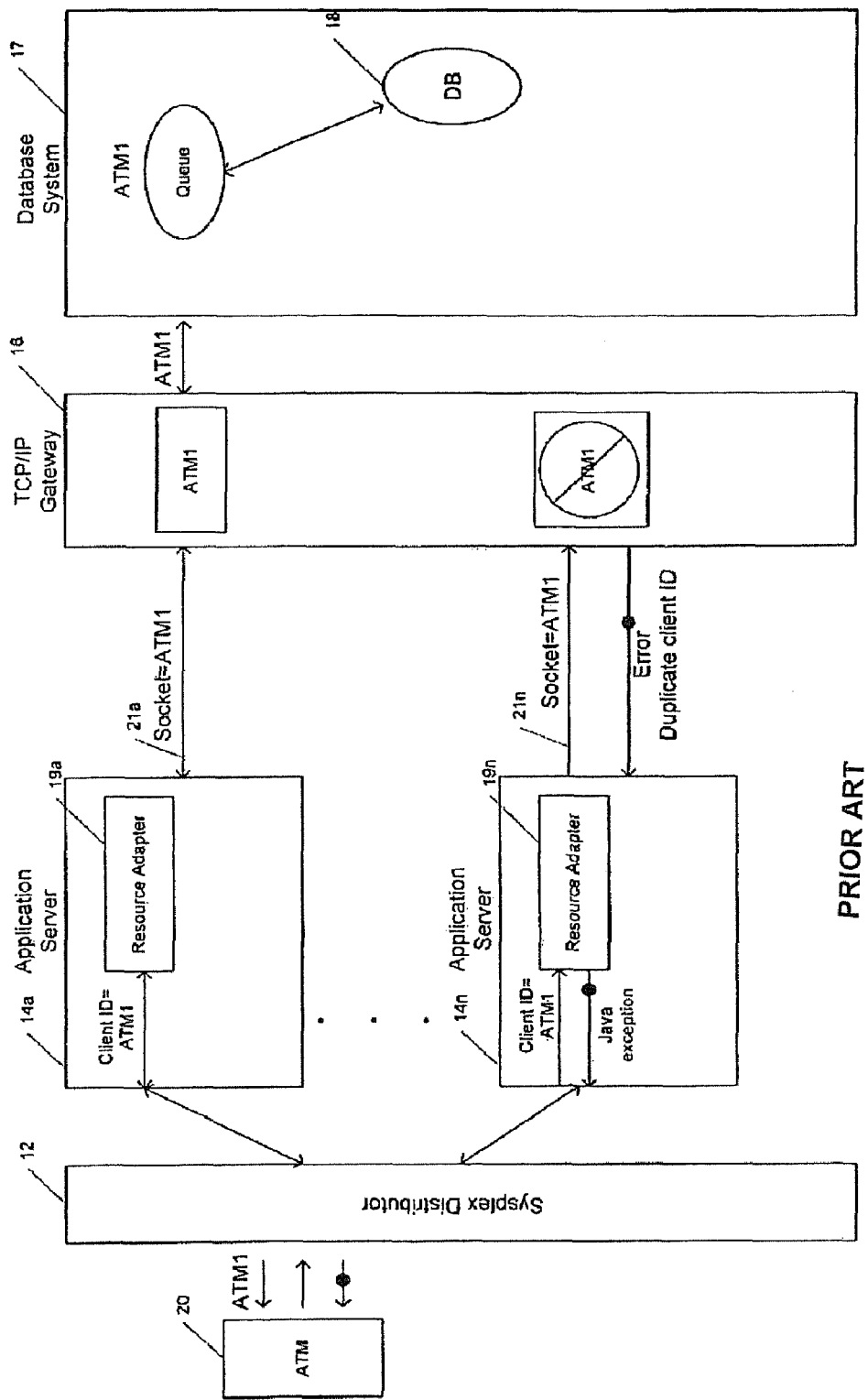
FIG. 1 is a first embodiment of a conventional sysplex enabled infrastructure.
Figure 2:
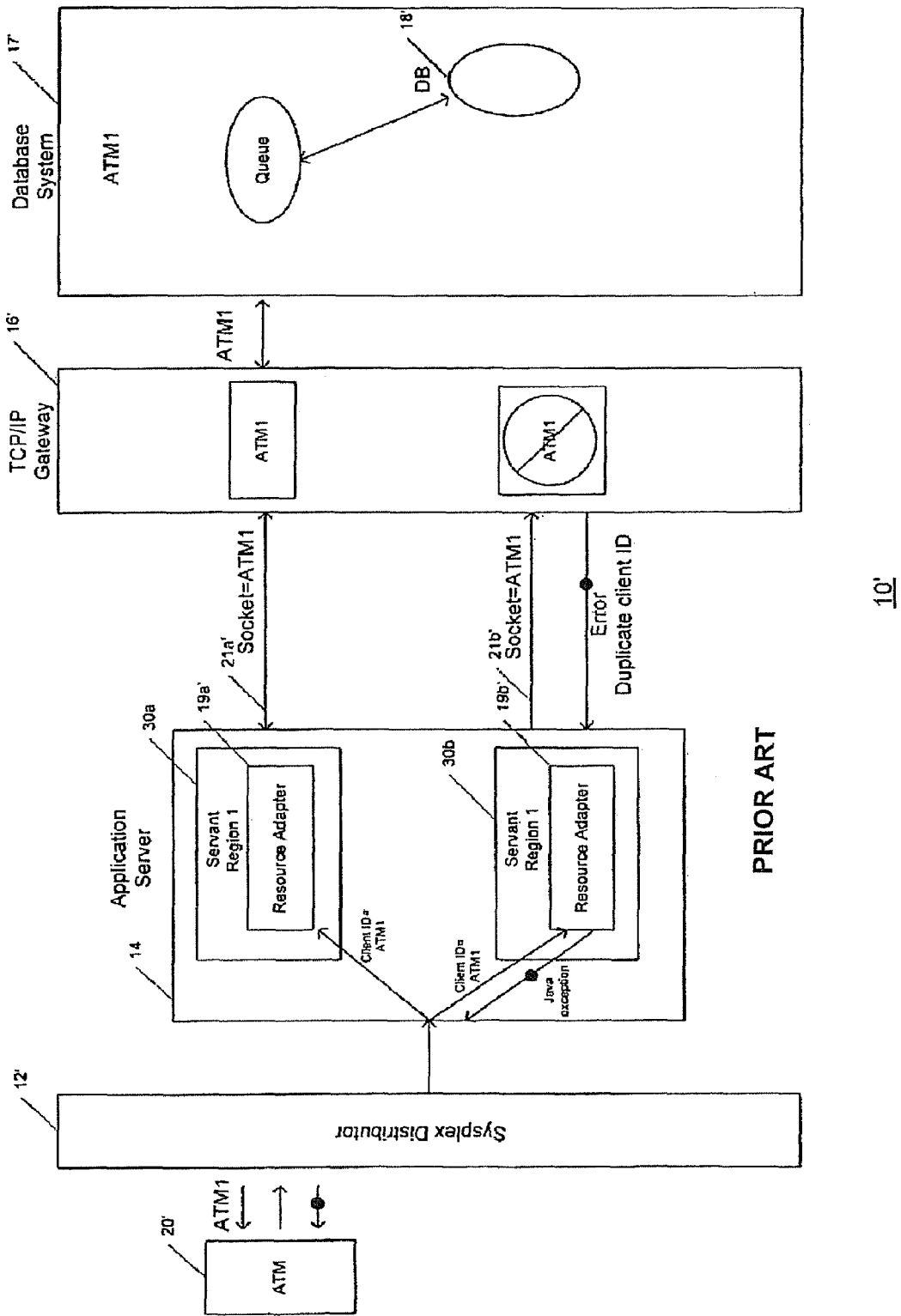
FIG. 2 is a second embodiment of a conventional sysplex enabled infrastructure.
Figure 3:
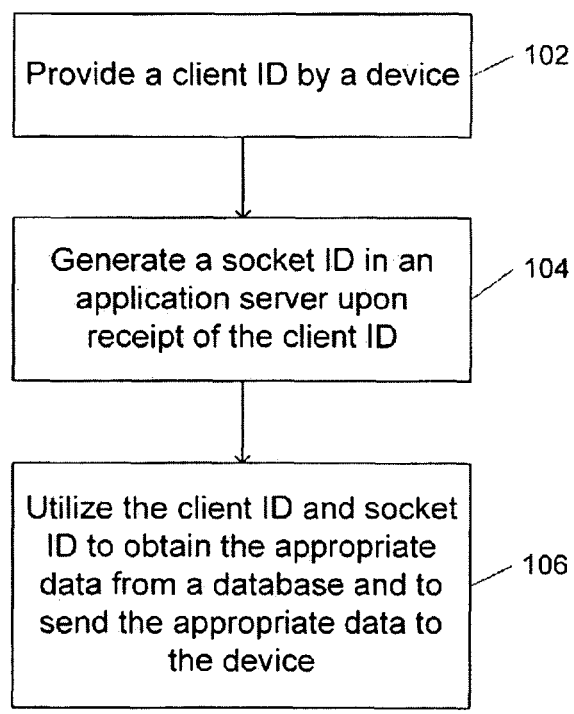
FIG. 3 is a flowchart in accordance with the present invention.

FIG. 3 is a flow chart in accordance with the present invention. First, a client ID is provided by a device, via step 102. Next, a socket ID is generated in an application server upon receipt of the client ID, via step 104. Finally, the client ID and socket ID are utilized to obtain the appropriate data from a database and to send the appropriate data to the device, via step 106.

Figure 4:
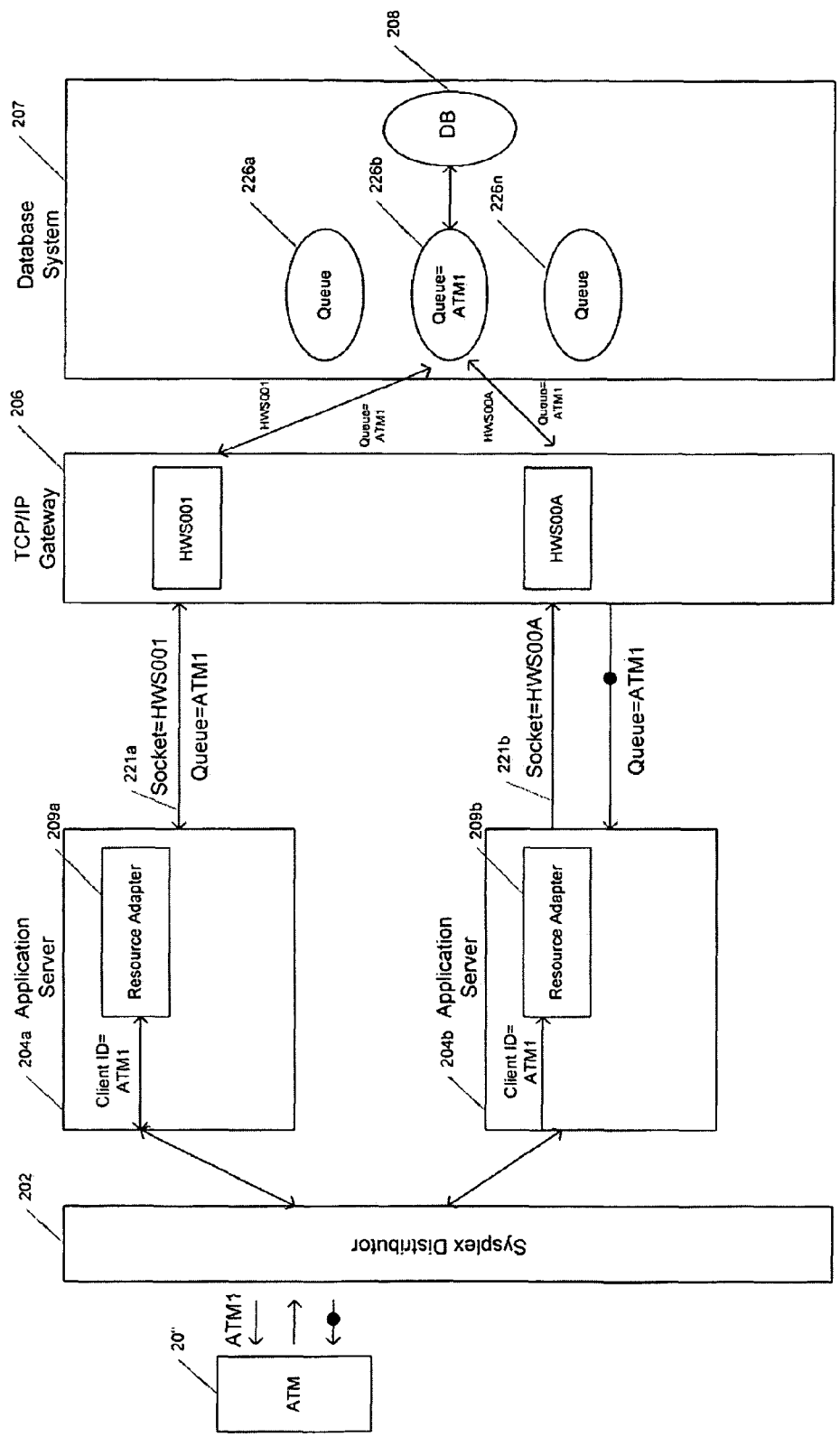
FIG. 4 illustrates an embodiment of a sysplex enabled infrastructure.

FIG. 4 illustrates a sysplex enabled infrastructure 200 in accordance with the present invention. The infrastructure 100 includes a sysplex distributer 202, a plurality of application servers 204a-204n, a TCP/IP gateway 206 and a database system 207. The sysplex distributor 202 assigns the transaction request to a specific application server 204a-204n. Each application server 204a-204n includes a resource adapter 209a-209n.

In this infrastructure 100, a transaction is sent from the ATM machine 20". The ATM machine 20" whose client ID is ATM1, sends the transaction through to a sysplex distributor 202 where the sysplex distributor 202 manages the workload and directs the transaction to an application server that is available, for example, application server 204a. The transaction is sent to the resource adapter 209a. The resource adapter 209a sends the transaction request to the database system 207 through a TCP/IP gateway 206 using a dedicated persistent socket connection 221a.

When the resource adapter 209a sends the transaction using a dedicated persistent socket connection 221a, the resource adapter 209a sends both the client ID and a generated socket ID in a message header to the TCP/IP gateway 206. In the message header, the generated socket ID is used to identify the socket name, for example, HWS001, and the client ID, ATM1, is passed as the queue name value inside the network message header.

The TCP/IP gateway 206 receives the transaction with the message header, reads the socket identifier flag only (as designed), and forwards the information to the database system 207 using the generated socket ID, HWS001, as the socket identifier. There is no change in the way the TCP/IP gateway 206 processes the transaction. The transaction is sent to a database queue 226a-226n that is identified by the queue name flag, ATM1. When the transaction is completed, the information is returned to the client application following the same route using the HWS001. The socket ID, HWS001, is then sent back to a connection pool of resource adapter 209a to be reused by the next transaction.

If the client applications send a second transaction the same process occurs. A transaction is sent from the ATM machine 20", whose client ID is ATM1. The transaction is distributed to an available application server such as application server 204b. The resource adapter 209b sends the transaction using a dedicated persistent socket 221b, where the resource adapter 209b sends both the client ID and a generated socket ID in a message header. The resource adapter 209b uses a new randomly generated socket ID, which in this case is HWS00A. In the network message header, HWS00A is used to identify the socket name and the client ID, ATM1, is passed as the queue name value.

Similarly, the TCP/IP gateway 206 receives the data, reads the socket flag, and uses the generated socket ID HWS00A to identify the socket connection to the database system 207. The transaction is processed in the database queue 226a-226n that was identified by the queue name, ATM1. All transactions sent from the client ATM1 are processed on the same database queue 226a-226n. This allows the customers to track their transactions. The transaction is processed and the information is sent back to the client application following the same route.

A system and method in accordance with the present invention uses the network message header to store customer-specified client ID so that the TCP/IP gateway 206 or follow-on middleware component has no knowledge of the special saved information. The information is saved in the message header for back-end database processing only.

There is no TCP/IP gateway dependency. Because a new socket ID is generated by the resource adapter 204a-204n internally and thus, bypasses any middle components, the TCP/IP gateway 206 does not need to be modified or have source code changes. This helps customers who use different TCP/IP gateways other than TCP/IP gateway 206.

A system and method in accordance with the present invention creates only one database transaction output queue 226b for each client application. Rather than having multiple output queues for each new generated socket ID, only one queue is created by using the original customer-specified client ID name as the queue name. This greatly reduces the storage requirement for implementing and creating database system queues.

A system and method in accordance with the present invention solves the duplicate client ID problem reported by the customers running application servers in the sysplex distributor environment. It also solves the problem for customers running application servers in the distributed environment.

A system and method in accordance with the present invention requires no code change from the customer. The customers do not need to change their client application or legacy database application.

As described earlier, the duplicate client ID problem can happen in any sysplex-enabled environment for a web client application; and is problematic for any database customer who has this type of software and hardware architecture. A system and method in accordance with the present invention avoids any changes from the customers' end and requires no TCP/IP gateway dependency.

With a system and method in accordance with the present invention, when the resource adapter 209a-209n, which is inside an application server 204a-204n or any application server servant region, sends a transaction through TCP/IP gateway 206 to a database server, it also sends a message header with specific transaction data that contains a newly generated socket ID value as well as the customer-specified client ID value. The database resource adapter 209a-209n invokes a random number generator to uniquely create a generated socket ID for the input transaction so that every new input transaction will have a new ID created. This uniquely generated socket ID is used for identifying the socket connection 221a-221n, and it is stored in the TCP/IP gateway defined client ID section of the message header. As a result, the dedicated persistent socket always has a unique ID name for communicating with the TCP/IP gateway 206.

In addition to the uniquely generated socket ID, the customer-specified client ID is also passed to the TCP/IP gateway 206. However, the customer-specified client ID is passed to the database system 207 using an existing section of the network message header. This existing section of the network message header is not used by the TCP/IP gateway 206 and is a section reserved for the resource adapter 204a-204n only.

By passing the customer-specified client ID in a pre-existing reserved section of the message header, the customer-specified client ID is transparent to the TCP/IP gateway 206 or any follow-on middleware components. This eliminates any interface changes to or from the TCP/IP gateway 206. When the database system 207 receives the transaction with the socket ID (which is the generated socket ID) and the customer-specified client ID in the network message header, the database system 207 detects the flag set by the resource adapter 204a-204n and correctly uses the customer-specified client ID to create a database output queue 226a-226n for transaction processing. This operation in the database system 207 is important so that one and only one database output queue 226a-226n is created for the client application using the customer-specified client ID.

The database system 207 does not use the socket ID, which is the generated socket ID, to create a processing queue. However, the input socket ID is saved for output delivery. When the database system 207 delivers the transaction output to the TCP/IP gateway 206, the database system 207 uses the saved socket ID to communicate with TCP/IP gateway 206 for returning the output. With this unique handling of the code in the database system 207, the creation of multiple database transaction queues 226a-226n using the different socket IDs is avoided and eliminates any impact to the database system 207 storage requirements.

The system and method in accordance with the present invention also applies to sysplex-enabled environments where one application server 204a-204n has several servant regions with multiple resource adapters (not shown). In all cases, no duplicate socket ID error is generated because the resource adapter 204a-204n sends a unique client ID for the socket identifier each time. The original client ID is stored in the network message header and used later by the database system 207 to contain all transactions in the same database output queue 226a-226n.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system, comprising:

a client device of a plurality of client devices;

an application server including a resource adapter to receive an asynchronously transmitted transaction message from the client device via a sysplex distributor, wherein the first transaction message includes a first client identifier associated with the client device, to generate a socket identifier, to associate the generated socket identifier with the asynchronously transmitted transaction message, and to send the asynchronously transmitted transaction message and the generated socket identifier to a database system via a transmission control protocol/internet protocol (TCP/IP) gateway using a dedicated persistent socket connection, wherein the application server is one of a plurality of application servers, wherein the generated socket identifier is used to identify the dedicated persistent socket connection and the client device;

wherein the sysplex distributor is operable to receive the asynchronously transmitted transaction message from the client device and to send the asynchronously transmitted transaction message to a particular application server of the plurality of application servers, wherein the particular application server is determined based on a workload analysis of the plurality of application servers;

wherein the database system is operable to receive the asynchronously transmitted transaction message and the generated socket identifier, to identify a particular database queue from a plurality of database queues in which to place the asynchronously transmitted transaction message for processing, the particular database queue identified based on the generated socket identifier, and to send a result of processing the asynchronously transmitted transaction message to the client device via the dedicated persistent socket connection based on the generated socket identifier when the database system has completed processing of the asynchronously transmitted transaction message; and wherein the resource adapter of the application server receives instructions from the database system to add the generated socket identifier to a connection pool for re-use after the database system has completed processing of the asynchronously transmitted transaction message.

2. The system of claim 1, wherein the TCP/IP gateway is operable to receive the asynchronously transmitted transaction message from the resource adapter, to read the generated socket identifier, and to forward the asynchronously transmitted transaction message to the database system via the dedicated persistent socket connection based on the generated socket identifier.

3. The system of claim 2, wherein the database system is operable to send the asynchronously transmitted transaction message to the particular database queue of the plurality of database queues based on the generated socket identifier.

4. The system of claim 3, wherein each of the plurality of client devices is associated with one of the plurality of database queues.

5. The system of claim 3, wherein the database system is operable to send a result of processing the asynchronously transmitted transaction message to the client device via the generated socket identifier when the database system has completed processing of the asynchronously transmitted transaction message.

6. The system of claim 4, wherein the resource adapter of the application server receives instructions from the database system to add the generated socket identifier to a connection pool for re-use when a next transaction message is received by the resource adapter after the database system has completed processing of the asynchronously transmitted transaction message.

7. The system of claim 1, wherein at least one of the plurality of client devices is an automated teller machine.

8. A computer implemented method, comprising:
receiving a first transaction message from a sysplex distributor at a first application server of a plurality of application servers, wherein the first application server is selected based on a workload analysis of the plurality of application servers, the first transaction message asynchronously transmitted to the sysplex distributor from a first client device of a plurality of client devices, wherein the first transaction message includes a first client identifier associated with the first client device, and wherein the first transaction message includes a request for information from a database system;
generating a first socket identifier;
assigning the first socket identifier to the first transaction message via a first resource adapter of the first application server, the first socket identifier associated with a first persistent socket connection;
adding the first client identifier and the first socket identifier to a first header of the first transaction message; and
sending the first transaction message to a first database queue of the database system via a transmission control protocol/internet protocol (TCP/IP) gateway using the first persistent socket connection, wherein the first database queue is associated with the first client identifier,
wherein the database system receives the first transaction message, identifies a particular database queue from a plurality of database queues in which to place the first transaction message for processing, the particular database queue identified based on the first socket identifier, and sends a result of processing the first transaction message to the first client device via the dedicated persistent socket connection based on the first socket identifier when the database system has completed processing the first transaction message, and
wherein the first resource adapter of the first application server receives instructions from the database system to add the first socket identifier to a connection pool for re-use after the database system has completed processing the first transaction message.

9. The computer implemented method of claim 8, wherein a second application server receives a second transaction message from the first client device via the sysplex distributor, wherein the second transaction message includes the first client identifier, and wherein the second transaction message includes a second request for information from the database system.

10. The computer implemented method of claim 9, wherein a second resource adapter of the second application server assigns a second socket identifier to the second request and wherein the second socket identifier is associated with a second persistent socket connection.

11. The computer implemented method of claim 10, wherein the second resource adapter sends the second transaction message to the first database queue of the database system via the TCP/IP gateway using the second persistent socket connection.

12. The computer implemented method of claim 11, wherein a second header of the second transaction message includes the second socket identifier and the first client identifier.

13. A storage device storing program instructions executable by a processor to:
transmit a transaction message from a particular application server of a plurality of application servers, wherein the transaction message was communicated to the particular application server via a sysplex distributor configured to assign the transaction message to the particular application server based on a workload analysis of the plurality of application servers;
generate a socket identifier associated with a dedicated persistent socket connection;
receive the transaction message at a database system from the application server using the dedicated persistent socket connection via a transmission control protocol/internet protocol TCP/IP gateway, wherein the transaction message includes a client identifier associated with a client device of a plurality of client devices and the socket identifier;
identify a particular database queue from a plurality of database queues in which to place the transaction message for processing, the particular database queue identified based on the socket identifier;
process the transaction message in the particular database queue;
send a result of processing the transaction message to the client device via the dedicated persistent socket connection based on the socket identifier after the database queue has completed processing of the transaction message; and
instruct a resource adapter of the application server to add the socket identifier to a connection pool for re-use after the database queue has completed processing of the transaction message.

14. The tangible non-transitory computer readable medium of claim 13, wherein the client device is an automated teller machine.

* * * * *